May 4, 1926.

J. R. ROBERTSON

TIRE HEATER

Filed Jan. 29, 1925     3 Sheets-Sheet 1

1,583,749

Inventor

J. R. Robertson.

By    *Attorney*

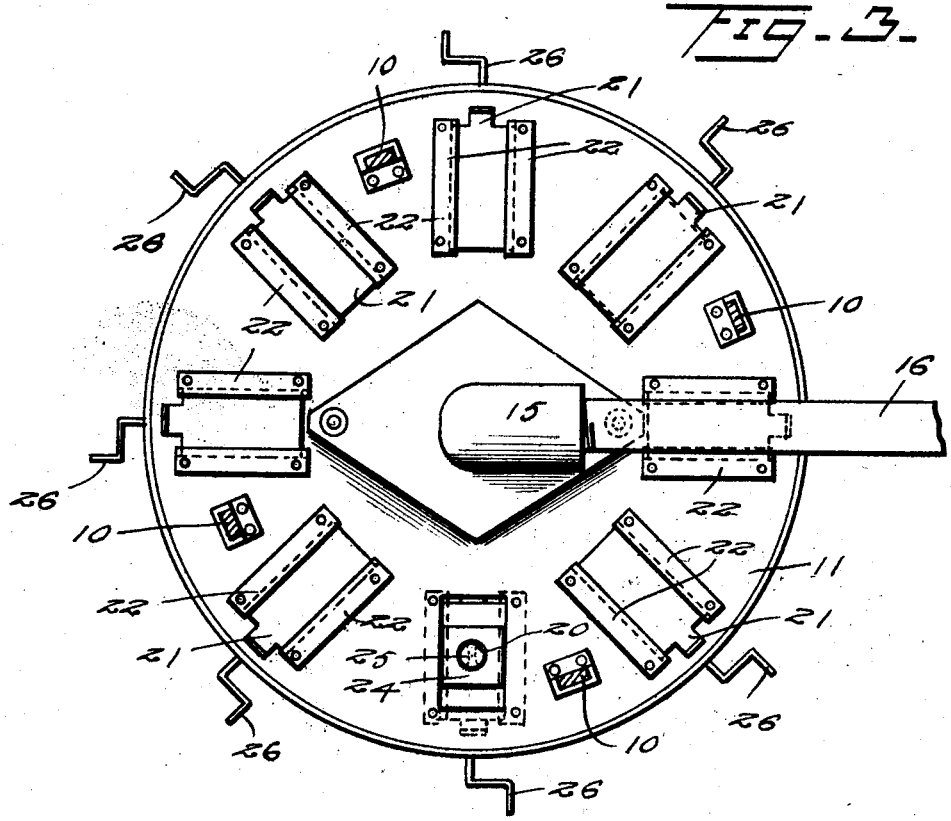

May 4, 1926.
J. R. ROBERTSON
1,583,749
TIRE HEATER
Filed Jan. 29, 1925     3 Sheets-Sheet 3
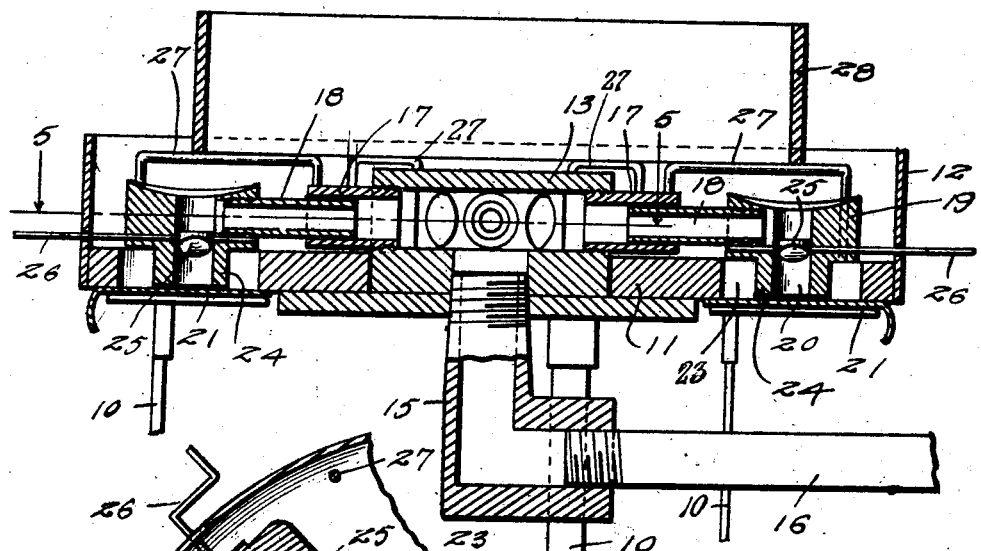
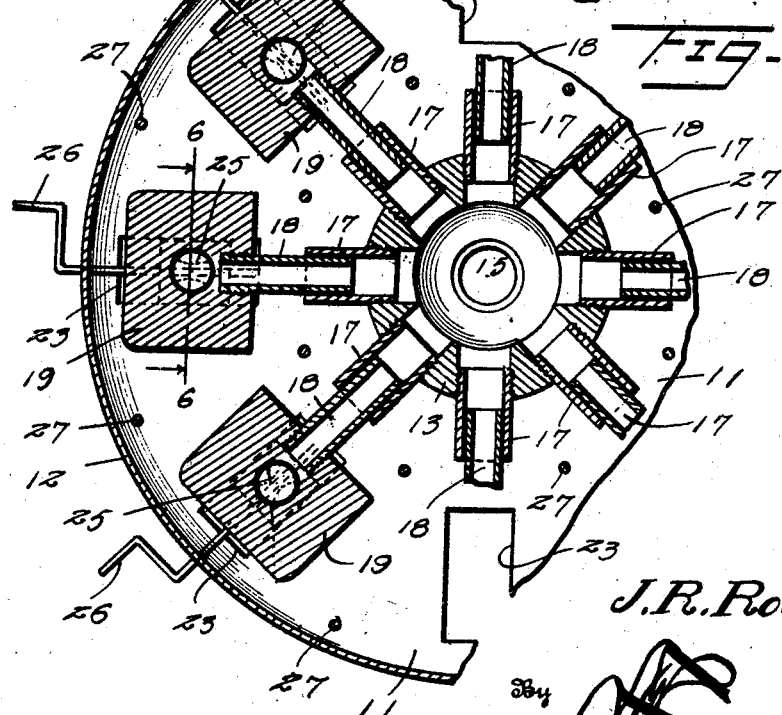
Inventor
J. R. Robertson.

Patented May 4, 1926.

1,583,749

UNITED STATES PATENT OFFICE.

JESSE R. ROBERTSON, OF WESTMORELAND, ALABAMA.

TIRE HEATER.

Application filed January 29, 1925. Serial No. 5,551.

*To all whom it may concern:*

Be it known that I, JESSE R. ROBERTSON, a citizen of the United States, residing at Westmoreland, in the county of Limestone and State of Alabama, have invented certain new and useful Improvements in Tire Heaters; and I do hereby declare the following to be a full, clear, and exact description of the invention, such as will enable others skilled in the art to which it appertains to make and use the same.

The present invention relates to an appliance for the use of wheelwrights, blacksmiths and others engaged in fitting metal tires to wooden wheels and which tires are expanded by heat and subsequently chilled to effect the shrinking thereof upon the wheel after being applied thereto.

The present invention provides an appliance for rapidly and conveniently heating such tires, the apparatus being mounted upon legs and adjustable within certain limits to different sized tires, and said apparatus utilizing a blast of air to intensify the heat of the fuel whereby to expedite the operation.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the specification,

Figure 3 is a view of the heater as seen from the bottom side,

Figure 4 is an enlarged vertical section on the line 4—4 of Figure 1,

Figure 5 is a horizontal sectional view on the line 5—5 of Figure 4,

Figure 6 is a detail sectional view on the line 6—6 of Figure 5, and

Figure 7 is a detail perspective view of a clean out closure.

Corresponding and like parts are referred to in the following description and designated in the several views of the drawings by like reference characters.

Figure 1:
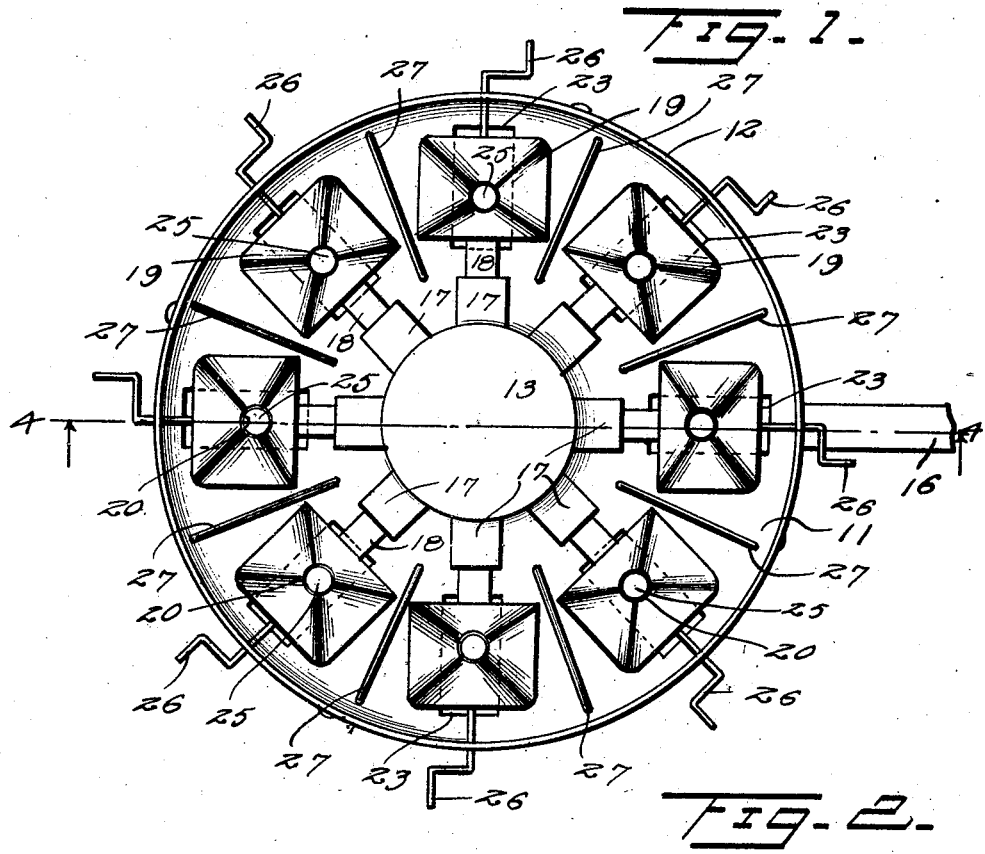
Figure 1 is a top plan view of a tire heater embodying the invention.
Figure 2:
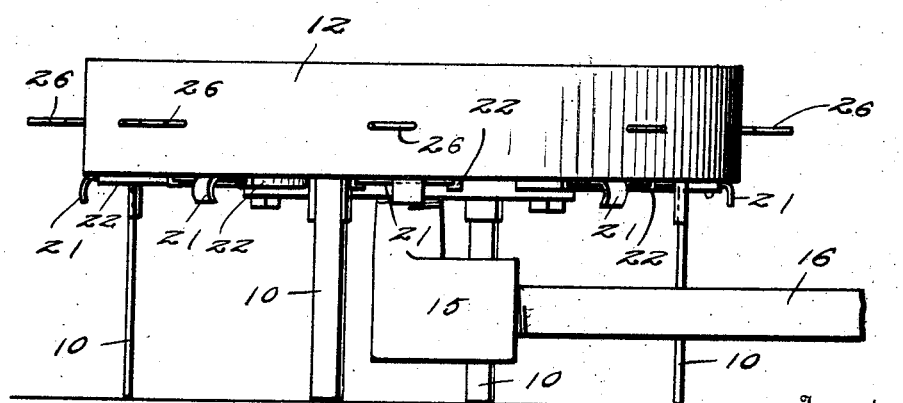
Figure 2 is a side view of the heater.

The heater comprises a pan which is preferably mounted upon legs 10 and which comprises a bed 11 and an upstanding rim 12. A header 13 is located centrally of the bed 11 and constitutes an air distributor. One member of an elbow 15 connects with the distributor 13 and an air pipe 16 connects with the other member for supplying air to the header from a blower (not shown) such as generally associated with a forge. A plurality of nipples 17 project radially from the air distributor 13 and tubes 18 have adjustable connection therewith, preferably by means of a slip joint, and each of these tubes is provided at its outer end with a nozzle 19 which consists of a block depressed in its top side and having a vertical opening 20 therein for the discharge of ashes and cinders. The nozzle 19 is adjustable toward and away from the center of the pan whereby to adapt the device to the size of the tire to be heated. The opening 20 provides a clean out and is closed at its lower end by means of a cut off 21 which is slidably mounted in guides 22 provided upon the bottom side of the bed 11. Radial openings 23 are formed in the bed 11 and receive projections 24 depending from the nozzles 19 and these projections together with the radial openings 23 direct the nozzles in their adjustments and hold them in a determinate position. A closure 25 is provided for each of the clean out openings 20 and is fast to the inner end of a rod 26 which passes loosely through an opening formed in the rim 12 and which is provided with a crank or other operating element at its outer end. The closure 25 fits the openings 20 and is of polygonal form so as to be turned to a position to provide a discharge for ashes and other accumulations which find an escape upon rotating the rod 26 and throwing the cut off 21 outwardly so as to uncover the clean out opening 20.

A rest 27 is provided between each two of the nozzles and forms a support for the tire 28 to be heated, and these rests are substantially of U-form and are attached to the bed 11 and are of a length to support tires of different diameters.

In the application of the appliance fuel is supplied to the outer portion of the pan in line with the nozzles, and the tire to be heated is placed upon the rest 27 and the flame is intensified by connecting a blower to the air pipe 16, and when it is required to remove obstructing matter from any one of the nozzles a cut off 21 is drawn outwardly and the rod 26 rotated so that any matter lodged in the openings 20 is permitted to discharge. Normally the openings 23 and the openings 20 are closed by the cut off 21 and the opening 20 is further closed by the element 25 which is usually about in line with the tube 18.

What is claimed is:—

1. A tire heater comprising a pan, an air distributor disposed centrally of the pan and nozzles connected with the air distributor, said nozzles being adjustable toward and away from the center of the pan to admit of adapting the device to tires of different diameters.

2. A tire heater comprising a pan, an air distributor located centrally of the pan, nozzles disposed about the outer portion of the pan and adjustable connections between the nozzles and the said air distributor.

3. A tire heater comprising a pan having openings in the outer portions of its bottom, an air distributor located centrally of the pan, nozzles located upon the outer portion of the pan and having depending portions entering the openings formed therein and adjustable connections between the nozzles and the air distributor.

4. A tire heater comprising a pan, a centrally disposed air distributor, nozzles upon the outer portion of the pan and having adjustable connections with the air distributor, and tire rests upon the outer portion of the pan and disposed between the nozzles.

5. A tire heater comprising a pan, a centrally disposed air distributor, nozzles upon the outer portion of the pan and connected with the air distributor, each of the nozzles having a vertical opening therein and a closure for each of the openings having flattened sides whereby to provide an escape for obstructing matter.

6. A tire heater comprising a bed having an upstanding rim, a centrally disposed air distributor, nozzles upon the outer portion of the bed and having adjustable connection with the air distributor, each of the nozzles having a vertical opening therein, a closure for each of the openings of the nozzles, a closure for the opening of each of the nozzles, and a rod for operating each of the closures and passing loosely through the rim projecting upwardly from the bed.

In testimony whereof I affix my signature.

JESSE R. ROBERTSON.